United States Patent
Rüegg et al.

(10) Patent No.: US 6,269,754 B1
(45) Date of Patent: Aug. 7, 2001

(54) STEAM GENERATOR FOR SUPERHEATED STEAM FOR INCINERATION PLANTS WITH CORROSIVE FLUE GASES

(75) Inventors: Hans Rüegg, Wohlen; Georg Ziegler, Winterthur, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/377,738

(22) Filed: Aug. 20, 1999

(30) Foreign Application Priority Data

Aug. 20, 1998 (EP) ................................... 98810816
Jul. 1, 1999 (EP) ................................... 99810564

(51) Int. Cl.$^7$ ...................... F23B 7/00; F23M 9/00
(52) U.S. Cl. ...................... 110/234; 110/343; 110/346; 110/314; 110/322; 110/323; 110/324; 122/460
(58) Field of Search ...................... 110/233, 234, 110/254, 343, 346, 180, 182, 314, 322, 323, 324, 325; 122/13.01, 503, 460, 467, 468

(56) References Cited

U.S. PATENT DOCUMENTS

| | | | |
|---|---|---|---|
| 1,674,080 | * | 6/1928 | Woerner ................ 110/322 |
| 1,738,283 | * | 12/1929 | Carlson ................ 110/323 |
| 2,511,647 | * | 6/1950 | Marshall ................ 110/56 |
| 3,174,463 | * | 3/1965 | Reagan ................ 122/4 |
| 4,033,297 | * | 7/1977 | Moreau ................ 122/476 |
| 4,312,302 | * | 1/1982 | Kollerup ................ 122/4 |
| 4,426,937 | * | 1/1984 | Seitmann et al. ................ 110/288 |
| 4,809,621 | * | 3/1989 | Materna ................ 110/323 |
| 5,573,605 | * | 11/1996 | Bendick et al. ................ 148/334 |
| 5,590,610 | * | 1/1997 | Sanbonmatsu ................ 110/234 |
| 5,673,527 | * | 10/1997 | Coston et al. ................ 52/506.02 |
| 5,687,657 | * | 11/1997 | Ziegler ................ 110/234 |
| 5,937,772 | * | 8/1999 | Khinkis et al. ................ 110/345 |

FOREIGN PATENT DOCUMENTS

| | | |
|---|---|---|
| 458032 | 3/1928 | (DE) . |
| 496575 | 4/1930 | (DE) . |
| 596661 | 5/1934 | (DE) . |
| 9107273 | 8/1992 | (DE) . |
| 22436 | 2/1930 | (NL) . |

OTHER PUBLICATIONS

"Design and Engineering of the 300–MW Lignite Boiler Plants..", Stiefel, et al., Sulzer Technical Review 2/1978, pp. 49–57.

"Thermische Abfallbehandlung", Thome–Kozmiensky, EF–Verlag fur energie und Umwelttechnik GmbH publication, 1994, pp. 390–403.

* cited by examiner

Primary Examiner—Denise L. Ferensic
Assistant Examiner—K. B. Rinehart
(74) Attorney, Agent, or Firm—Burns, Doane, Swecker & Mathis, L.L.P.

(57) ABSTRACT

The invention relates to a steam generator (1) for superheated steam for incineration plants with corrosive flue gases, essentially comprising a radiation section (2) and a convection section (5), having at least one superheater (8) and having plates (10) arranged on the inside of at least one wall (9) of the radiation section (2), a space (12) being provided between the plates (10) and the wall (9) of the radiation section (2), and at least part of the superheater (8) being arranged as a wall superheater (15) in the space (12) in the radiation section (2). The steam generator is distinguished by the fact that the space (12) contains a noncorrosive gaseous atmosphere which is at a higher pressure than the pressure of the gases in the combustion chamber (3). In this way, it is possible to reach a high superheater temperature without corrosion to the final superheater, so that the superheater can be made from inexpensive material.

17 Claims, 3 Drawing Sheets

STEAM GENERATOR FOR SUPERHEATED STEAM FOR INCINERATION PLANTS WITH CORROSIVE FLUE GASES

BACKGROUND OF THE INVENTION

1. Field of the Invention

The invention relates to the field of the thermal treatment of garbage, special garbage or clarification sludge. It relates to a steam generator for superheated steam for incineration plants with corrosive flue gases, essentially comprising a radiation section, with at least one combustion chamber, and a convection section, having at least one superheater and having plates arranged on the inside of at least one wall of the radiation section, a space being provided between the plates and the wall of the radiation section, and at least part of the superheater being arranged as a wall superheater in this space.

2. Discussion of Background

It is known in the prior art to use steam boilers for garbage incineration plants, natural circulation boilers, but also forced-circulation boilers or once-through boilers, being predominantly employed.

At the present time, the boilers used for garbage incineration plants in Central European countries are preferably those in which the gas flowing out of the combustion chamber flows via a first empty flue with downward flow into a second empty flue with upward flow and subsequently into a horizontal bunching flue (convection section). Garbage incineration boilers in which the gases, after they have flowed through the combustion chamber, flow directly into the horizontal convection flue, are also known. In addition to these horizontal closed-loop boilers, vertical steam generators for garbage incineration plants are also known, in which the convection section is arranged vertically and which are usually of the three-flue or four-flue type (K. J. Thermische Abfallbehandlung [Thermal Waste Treatment]. EF Verlag f ür Energie- und Umwelttechnik GmbH, 1994, pages 390–402).

In these known garbage incineration boilers, evaporators, final superheater, superheaters and economizer are accommodated in this order in the convection section. This arrangement applies particularly for the typical steam parameters of 40 bar, 400° C. For corrosion reasons, the superheater is exposed to relatively low gas temperatures (<650° C.) and therefore also has to be large.

A drawback of these boilers is that the final superheaters are corroded at wall temperatures of over 350° C., because the contaminants entrained by the off-gas become pasty on the tubes at high temperature and lead to encrustation and soiling. Although a higher steam temperature than 400° C. would be desirable in terms of electricity generation, the corrosion problem rules this out altogether.

In order to protect the combustion chamber walls of garbage incineration plants from corrosive gases, it is known to apply plates or ramming compounds, e.g. silicon carbide, with a good thermal conductivity to the walls of the combustion chamber. In some instances, these plates are also designed with a space between plates and tube wall. This space, which contains a noncorrosive gas atmosphere, prevents the wall tubes from being corroded by gases which may diffuse through the rammed coating.

Furthermore, coal-fired power plant boilers with wall superheaters made from corrosion-resistant steel are known, which on the one hand take up heat for the superheater at high temperatures, and on the other hand protect the gastight boiler wall, which is made from low-alloy steel, from excessively high temperatures (W. Stiefel, M. Caravetti: "Design and Engineering of the 300-MW Lignite Boiler Plants Sostanj 4 and Yuan Bao Shan", Sulzer Technical Review (1978), part 2, pages 48–57).

The drawback of this design solution consists in the fact that high-alloy and therefore extremely expensive steel has to be used for the wall superheaters.

DR 496,575 has disclosed a lining for combustion chambers, in which the insides of the chamber walls, after firing, are covered with thin-walled, heat-permeable and thermally stable metal screens which are arranged at a distance from one another. In this way, the combustion chamber walls which are covered with heating surfaces are to be protected from excessively high temperatures. The heat which is taken up by the metal screens is dissipated by cold gases which flow past the back of the screens and are blown in by means of a fan.

In DE 458,032, a superheater, which is designed as a wall superheater, is heated by the radiant heat from the combustion chamber, a solid wall of refractory bricks being arranged between the superheater and combustion chamber. Additional air flows around the superheater, and the partition has large openings for the additional air to be discharged. The aim is to control the superheater temperature by cooling the superheater tubes. The intention is therefore not to protect against corrosion, and such protection functions indirectly only when the air is flowing.

SUMMARY OF THE INVENTION

Accordingly, one object of the invention is to avoid the abovementioned drawbacks of the prior art and to provide a novel steam generator for superheated steam for incineration plants with corrosive flue gases, in which it is possible to achieve a high superheater temperature without corrosion to the final superheater, so that the superheater can be made from inexpensive material. The superheater is to take up as much heat as possible per unit of superheating surface area. Moreover, it is intended for it to be possible to convert existing boilers relatively easily.

According to the invention, this is achieved with a steam generator by the fact that the space between the plates and the wall of the radiation section, in which the wall superheater is arranged, contains a noncorrosive gaseous atmosphere which is at a higher pressure than the pressure of the gases in the combustion chamber.

The advantages of the invention consist in the fact that a high superheater temperature can be set in the steam generator according to the invention, while corrosive influences are largely suppressed. The overall superheater area which is required is reduced. Since at least part of the superheater is exposed to the radiation, in addition the partial-load performance of the steam generator is improved. The higher pressure in the space in which the wall superheater is arranged, and the absence of openings in the plates, or else the presence of only small openings (<1% of the wall area), ensure that it is impossible for any gas from the combustion chamber to penetrate into the space with the noncorrosive atmosphere.

It is advantageous if the plates are made from a nonmetallic inorganic material and have ribs on the side facing toward the tubes of the superheater, which ribs at least partially surround the tubes of the superheater. In this way, the amount of heat which is transferred to the superheater tubes is advantageously increased.

It is advantageous if a gas, preferably air, which is preheated flows through the space to the minimum possible extent, since in this way corrosive gases which have diffused through the plates are flushed away. On the other hand, there is no undesirable cooling of the tubes.

It is particularly expedient if the wall of the radiation section is a tube-web-tube connection which is designed as an evaporator, since in this way the gas tightness is ensured without expansion problems.

Furthermore, it is advantageous if only the final superheater or only the hottest part of the final superheater is arranged as a wall superheater in the space with a noncorrosive atmosphere in the radiation section, since in these parts of the superheater, the high temperatures mean that the abovementioned corrosion problems would be widespread without counter-measures. As a result of the final superheater being positioned in the radiation section, for example the combustion chamber, the heating surface area in the convective flue is reduced, and therefore additional evaporator heating surface area is installed in the convective flue. This additional evaporator heating surface area which is to be installed is smaller than in the situation in which, as is also possible, the entire superheater is arranged as a wall superheater in the space with the noncorrosive atmosphere between the wall and the plates, in order to keep the amount of heat withdrawn from the flue gases constant.

Furthermore, it is expedient if the wall superheater is arranged on all four walls of. the radiation section, for example of the combustion chamber, since the height of the wall superheater can then be minimized.

However, it is also advantageous if the wall superheater is arranged on only some of the walls of the radiation section, since this design solution is simpler, since it is possible to get round differential expansion problems in the corners.

Moreover, it is advantageous if the height of the rear-ventilated space is significantly greater than the height of the wall superheater. In this way, in addition, a larger surface area of the evaporator wall is protected.

It is expedient if the wall superheater comprises individual tubes which are arranged above one another in a single plane and can expand freely toward one another, inlet and outlet headers being arranged perpendicularly outside the radiation section, the attachment of the plates and the attachment of the superheater tubes being provided by a common component, and the tubes of the wall superheater being made from low-alloy boiler steel. This is a relatively simple and inexpensive design.

A further advantage is achieved by arranging an insulating layer between the wall of the radiation section and the tubes of the wall superheater, the insulating layer being provided with a heat-reflecting surface on the side facing the wall superheater. This ensures that as little heat as possible flows on from the superheater tubes to the evaporator wall.

Further advantageous configurations of the invention are given in the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which show two exemplary embodiments of the invention relating to a steam generator with two vertical empty flues and one horizontal convective bunching flue which is used for garbage incineration, wherein.

Only those components which are essential in order to understand the invention are shown. The direction of flow of the media is indicated by arrows.

DESCRIPTION OF THE PREFERRED EMBODIMENTS

Figure 1:
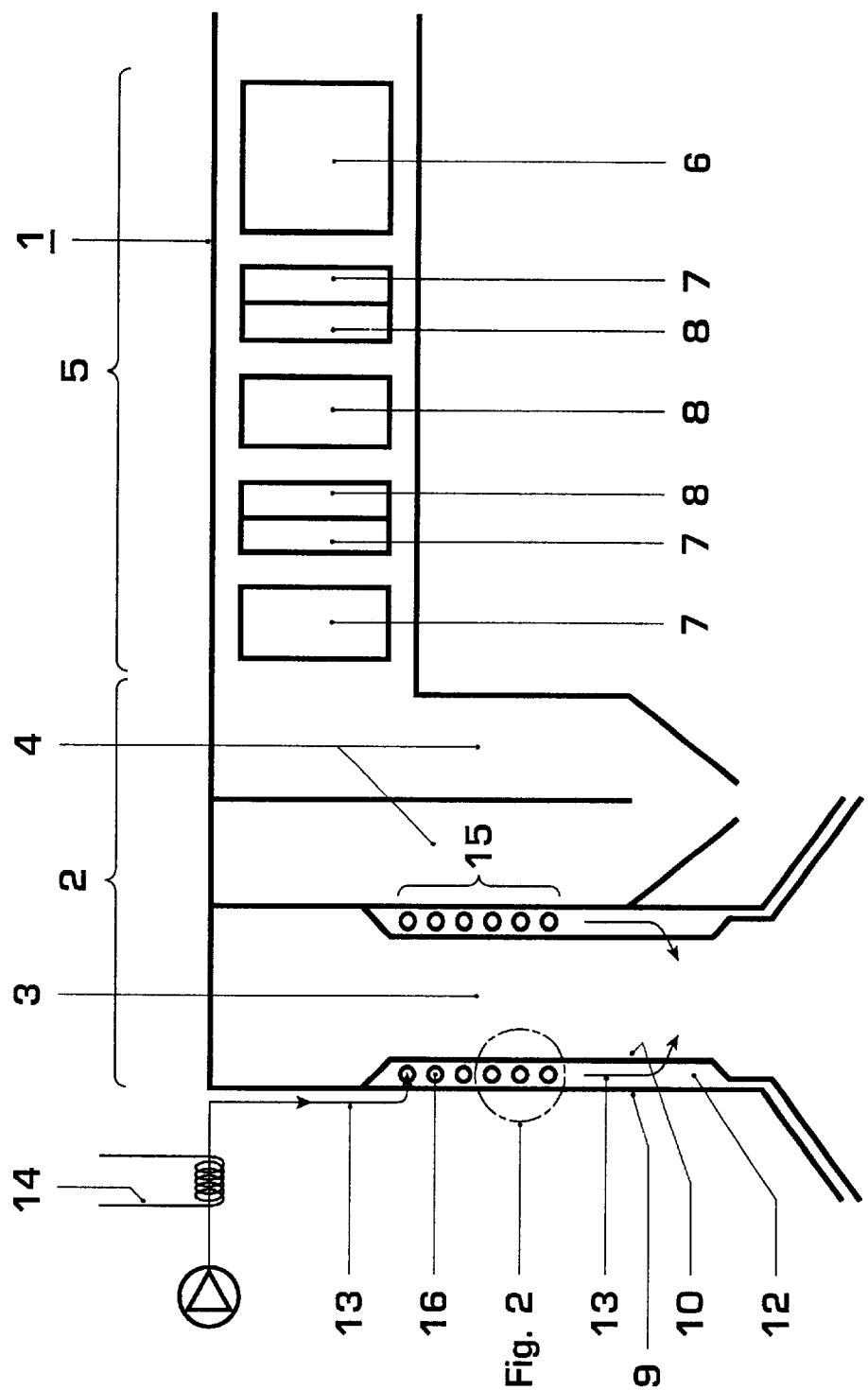
FIG. 1 shows a diagrammatic partial longitudinal section through the steam generator according to the invention.
Figure 2:
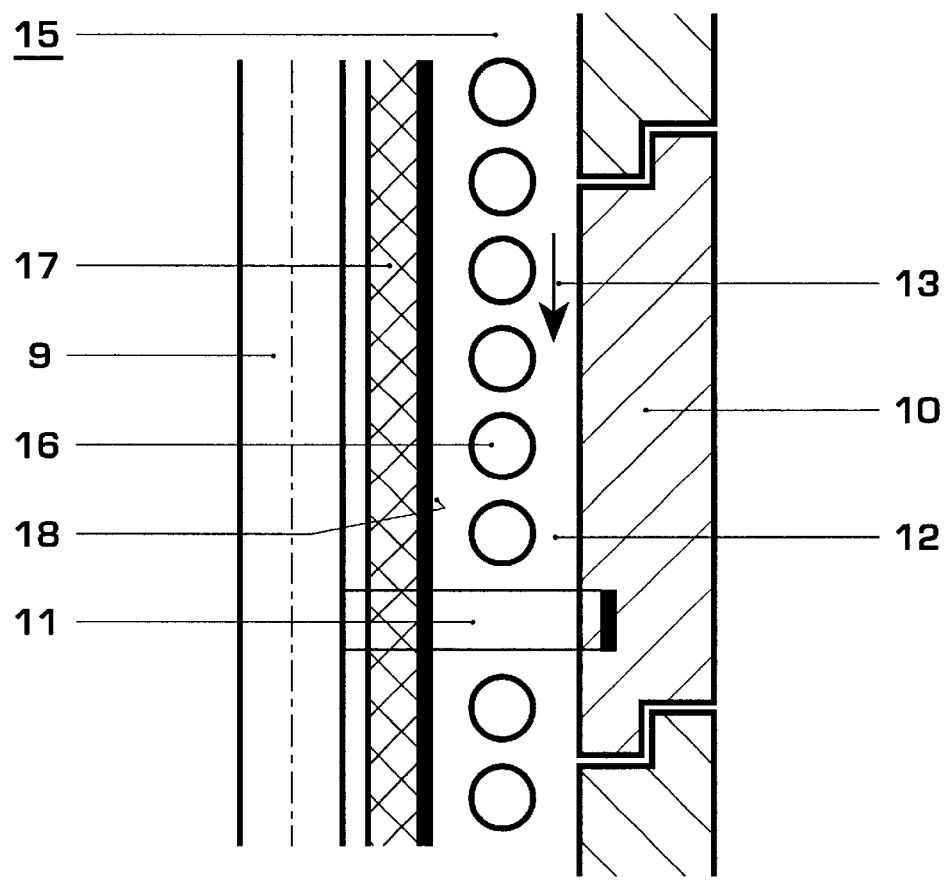
FIG. 2 shows an enlarged detail from FIG. 1 in the area of the wall superheater, in a first embodiment of the invention.

Referring now to the drawings, wherein like reference numerals designate identical or corresponding parts throughout the several views, FIG. 1 shows a diagrammatic partial longitudinal section through the steam generator 1 according to the invention, which is used for the thermal treatment of garbage. FIG. 2 shows an enlarged detail from FIG. 1. The two figures are to be referred to simultaneously in order to gain a better understanding of the invention.

The steam generator 1 is a closed-loop boiler and essentially comprises a radiation section 2, having a combustion chamber 3 and two vertical empty flues 4, and a horizontal convection section 5, in which the heating surfaces for the economizer 6, evaporator 7 and superheater 8 are arranged. In order to protect the combustion chamber wall 9 from corrosive gases, plates 10, which are attached to the wall 9 via plate-support elements 11, are arranged on the combustion chamber wall 9 inside the combustion chamber 3. The plates 10 are made from ceramic material. The combustion chamber wall 9 is designed as a tube-web-tube connection and thus forms a gastight jacket. It serves as an evaporator.

The plates 10 are not arranged directly on the wall 9, so that a space 12 extends between the wall 9 and the plates 10. This space 12 has a noncorrosive gaseous atmosphere 13 which is virtually immobile. Gas 13, in this case air, which is preheated outside the space 12 by means of a heater device 14, may also flow through the space 12 from the top downward, as illustrated in FIG. 1. In this case, however, as little air 13 as possible should flow through the space 12. After it has flowed through the space 12, the air 13 is discharged into the combustion chamber 3. In the top part of the space 12, the final superheater of the steam generator 1 is arranged as a wall superheater 15 between the plates 10 and the tube wall 9. Most of the heat transfer to the superheater tubes is effected by radiation from the hot plates 10.

It is advantageous for the amount of air which flows through the corrosion-free space to be as small as possible, since this allows the minimum possible heat to be withdrawn again from the superheater tubes. For this reason, the outlet openings for the gas 13 should be as small as possible, or else there should be no such openings. Even without outlet openings for the gas, gas will still continue to flow if there is excess pressure, since the plates are not absolutely sealed (gaps, cracks, pores, etc.). If there are outlet openings, these should open into the combustion chamber 3. The higher gas pressure in the space 12, which should preferably be at least 0.2 mbar higher than in the combustion chamber 3, ensures that no corrosive flue gases from the combustion chamber 3 pass into the space 12.

The wall superheater 15 comprises individual tubes 16 which are arranged below one another in a single plane. They are able to expand freely toward one another. In this exemplary embodiment, the wall superheater 15 is arranged on all 4 combustion chamber walls 9. In other exemplary embodiments, of course, it may also be fitted to only some of the walls 9. The final superheater (wall superheater 15) is situated downstream of the final injection, with regard to the steam.

Positioning the final superheater 15 in the combustion chamber 3 reduces the heating surface area in the convective section 5 of the steam generator 1. In order for the gases nevertheless to be cooled to the desired final temperature, additional evaporator surface is installed in the convective flue 5. However, the total superheating surface area of the steam generator 1 becomes smaller, since part of the superheater, namely the wall superheater 15, is exposed to the radiation. For this reason, the partial-load performance of the boiler is also improved. However, at least part of the superheater 8 is arranged in the convection section 5 of the steam generator 1.

The inlet and outlet headers, which are not shown in FIG. 1 and FIG. 2, are arranged perpendicularly outside the combustion chamber 3, the inlet header being positioned above the outlet header, allowing easy drainage. The tubes 16 are attached at the same time as the prefitted plates 10 are attached, by means of the common components 11.

The plates 10 protect the tubes 16 from corrosion by flue gases which flow through the combustion chamber 3, since there is no corrosive gas atmosphere prevailing inside the space 12, but rather only preheated air circulates around the space 12 and therefore the tubes 16. There is therefore no choking of the hottest superheater tubes 16 by flue gases. Therefore, there is no problem with manufacturing the tubes 16 of the wall superheater 15 from normal, inexpensive boiler steel even for use under high steam parameters, which has a beneficial effect on the total costs of the plant.

To ensure that as little heat as possible flows from the superheater tubes 16 to the evaporator wall 9, an insulating layer 17 is arranged between the wall superheater 15 and the boiler wall 9. On the side facing toward the wall superheater 15, this layer 17 is provided with a heat-reflecting surface 18.

The invention makes it possible to reach high superheater temperatures without corrosion to the final superheater.

The solution according to the invention can be implemented not only for newly constructed garbage incineration boilers, but also for the conversion of existing boilers. Moreover, it can be used for the incineration of clarification sludge or of special garbage.

Figure 3:
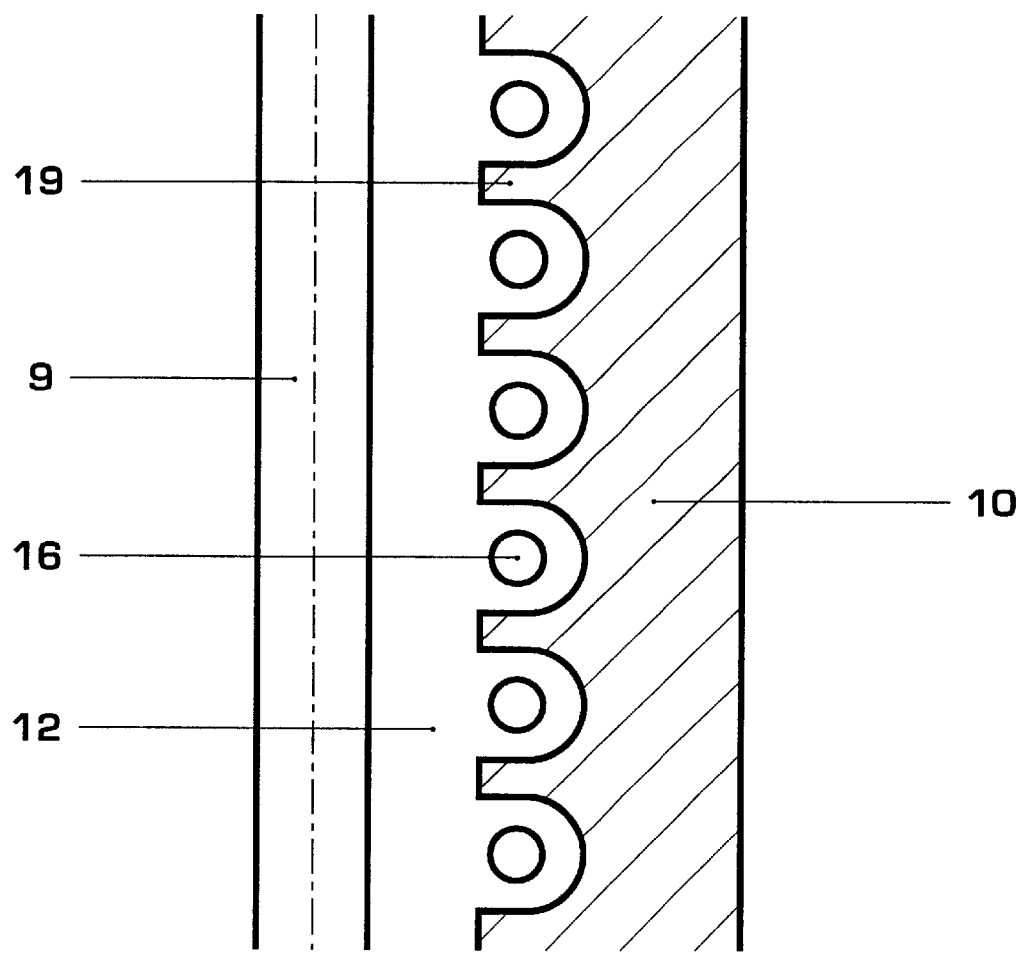
FIG. 3 shows an enlarged detail from FIG. 1 in the area of the wall superheater, in a second embodiment of the invention.

FIG. 3 shows an enlarged detail from FIG. 1 in the area of the wall superheater, in a second embodiment of the invention. This embodiment differs from that which has already been described only in that the plates 10 have ribs 19 on their side facing toward the tubes of the superheater 8, which ribs at least partially surround the tubes of the superheater 8. This has the advantage that the amount of heat which is transferred to the superheater tubes is increased, due to the larger surface area.

Naturally, the invention is not limited to the exemplary embodiment described, for example, it is possible to place not just the final superheater, but also the entire superheater as a wall superheater 15 in the space 12 between the tube wall 9 and the plates 10. A small amount of air or another gas may flow through the space 12, or preferably no gas flows through the space 12.

Moreover, it is possible for only a part, preferably the last, hottest part of the final superheater, to be arranged in the space 12, rather than the entire final superheater.

As an alternative to plates 10, the combustion chamber lining may also comprise a ramming compound or another material which is resistant to corrosion under these conditions.

Naturally, the superheater 8, which is designed as a wall superheater 15, may also be arranged in an empty flue 4 of the radiation section 2, instead of in the combustion chamber 3.

The steam generator may also be employed for other types of boiler if it is necessary to protect the superheater owing to the corrosive atmosphere.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A steam generator for superheated steam for incineration plants with corrosive flue gases, comprising:
   a radiation section with at least one combustion chamber, the radiation section including at least one wall;
   a convection section having at least one superheater and having plates arranged on the inside of the at least one wall of the radiation section;
   a space between the plates and the at least one wall of the radiation section, at least part of the superheater comprising a wall superheater in the space, wherein the space contains a noncorrosive gaseous atmosphere which is at a higher pressure than the pressure of the gases in the combustion chamber.

2. The steam generator as claimed in claim 1, wherein the plates are made from a nonmetallic inorganic material.

3. The steam generator as claimed in claim 1, wherein the wall superheater comprises tubes, and wherein the plates have ribs on their side facing toward the tubes of the wall superheater the ribs at least partially surrounding the tubes of the wall superheater.

4. The steam generator as claimed in claim 1, wherein the gaseous atmosphere flows through the space to the minimum possible extent.

5. The steam generator as claimed in claim 4, wherein the gaseous atmosphere is preheated.

6. The steam generator as claimed in one of claim 1, wherein the pressure in the space is at least 0.2 mbar higher than in the combustion chamber.

7. The steam generator as claimed in one of claim 1, wherein the convection section contains part of the superheater.

8. The steam generator as claimed in claim 1, wherein the at least one wall is a gastight tube-web-tube connection evaporator.

9. The steam generator as claimed in claim 1, wherein only the hottest part of the final superheater comprises the wall superheater in the space.

10. The steam generator as claimed in claim 1, wherein the radiation section comprises four walls, and wherein the wall superheater is arranged on all four walls of the radiation section.

11. The steam generator as claimed in claim 1, wherein the height of the space is significantly greater than the height of the wall superheater.

12. The steam generator as claimed in claim 1, wherein the wall superheater comprises;
   individual tubes which are arranged above one another in a single plane and can expand freely toward one another; and
   inlet and outlet headers arranged perpendicularly outside the radiation section.

13. The steam generator as claimed in claim 12, wherein the individual tubes of the wall superheater are made from low-alloy boiler steel.

14. The steam generator as claimed in claim 12, further comprising a common plate-support element, and wherein the individual tubes of the wall superheater and the plates arranged on the inside of the at least one wall are attached to the common plate-support element.

15. The steam generator as claimed in claim 1, wherein the wall superheater further comprises tubes, and further comprising an insulating layer arranged between the at least one wall and the tubes of the wall superheater.

16. The steam generator as claimed in claim 1, wherein the steam generator is configured and arranged to be used in plants for the incineration of a material selected from the group consisting of garbage, special garbage, and clarification sludge.

17. The steam generator as claimed in claim 15, wherein the insulating layer comprises a heat-reflecting surface on a side facing toward the wall superheater.

* * * * *